April 30, 1957 — L. W. WILLIAMSON — 2,790,266
LIVE BAIT CONTAINER
Filed April 15, 1955
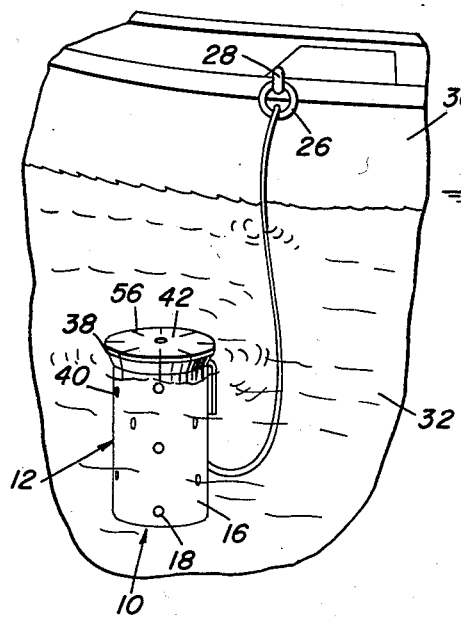
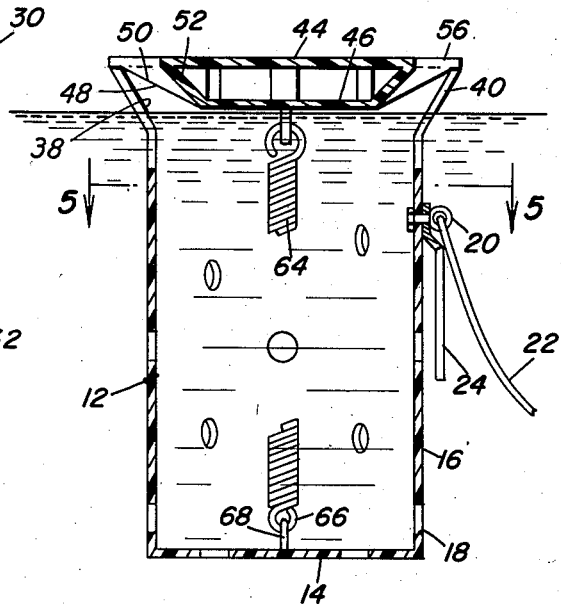
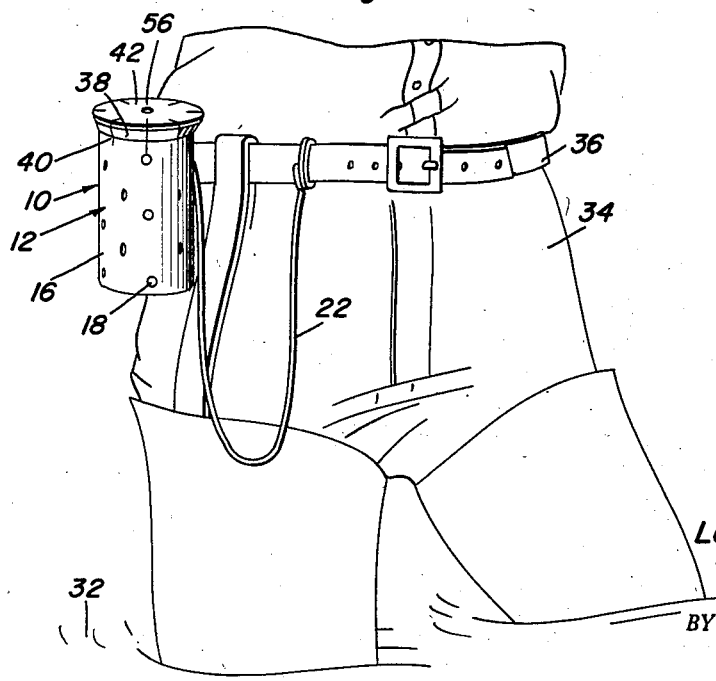
Lowell W. Williamson
INVENTOR.

April 30, 1957  L. W. WILLIAMSON  2,790,266
LIVE BAIT CONTAINER
Filed April 15, 1955  2 Sheets-Sheet 2
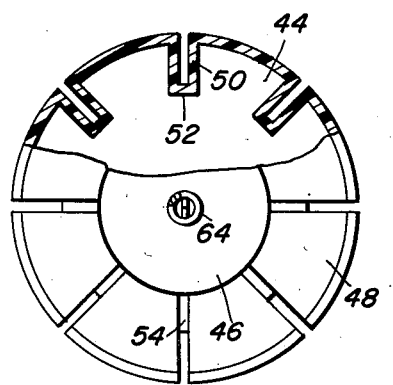
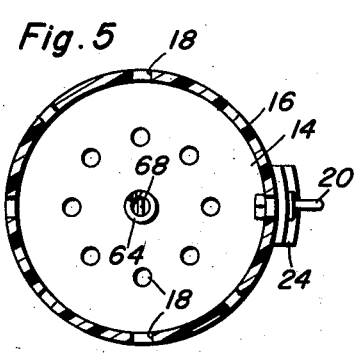
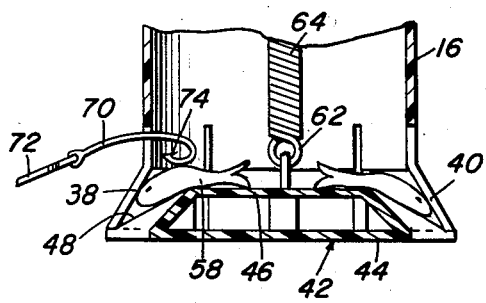
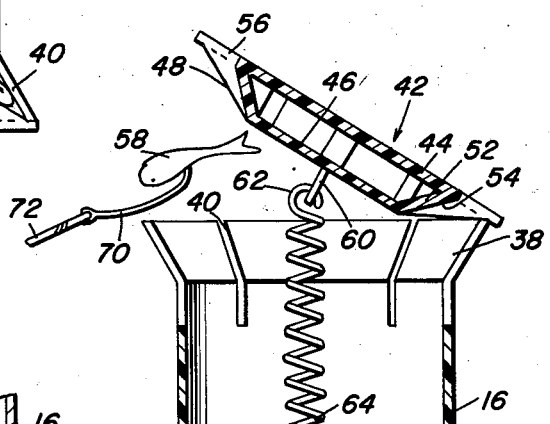
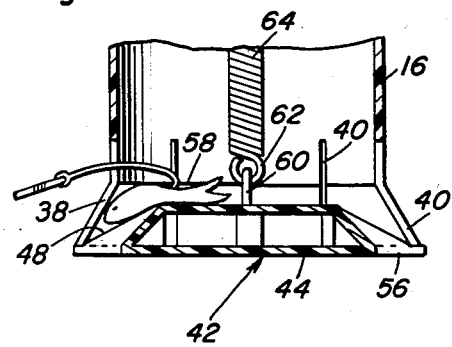
Lowell W. Williamson
INVENTOR.

United States Patent Office

2,790,266
Patented Apr. 30, 1957

2,790,266

LIVE BAIT CONTAINER

Lowell W. Williamson, Lawton, Okla.

Application April 15, 1955, Serial No. 501,481

6 Claims. (Cl. 43—55)

This invention generally relates to a fishing accessory, and more specifically, provides improved and novel construction in live bait containers.

An object of the present invention is to provide a live bait container embodying a receptacle having a removable top thereon together with means for permitting insertion of a fishhook into the interior of the container so that live bait may be impaled thereon without the necessity of handling the bait with the hands.

Another object of the present invention is to provide a novel construction in a live bait holder wherein means is provided for generally positioning the bait for ease of impaling the bait on the fishhook.

Still another object of the present invention is to provide a live bait container conformable to the preceding objects in which the bait container may be suspended from a fisherman's belt or boat either out of the water or resting in the water.

A still further important object of the present invention is to provide a bait holder in accordance with the preceding objects in which the bait container is transparent and so constructed that a fisherman can bait his hook with live minnows, crickets, roaches, bugs, frogs and the like without having to hold or touch the bait with his hands.

Still another important feature of the present invention is to provide a bait holder of a size to suit an individual fisherman for holding a single supply of bait and also which will permit hooks of persons thoroughly acquainted with fishing to be easily baited.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the live bait holder of the present invention suspended from a boat and positioned in the water;

Figure 2 is a perspective view showing the bait holder of the present invention attached to the belt of a fisherman;

Figure 3 is a longitudinal, vertical sectional view taken substantially upon a plane passing along the longitudinal center of the live bait holder of the present invention;

Figure 4 is a bottom view of the top, with portions being sectioned;

Figure 5 is a plan sectional view taken substantially upon a plane passing along section line 5—5 of Figure 3 showing further structural details of the live bait holder of the present invention;

Figure 6 is a fragmental sectional view showing the live bait container in inverted position wherein the live bait therein is positioned and showing the initial step in impaling such bait upon a hook;

Figure 7 is a fragmental sectional view similar to Figure 6 showing the second step in impaling the live bait upon the hook; and Figure 8 is a fragmental sectional view of the same portion of the container illustrated in Figures 6 and 7 wherein the container has been righted to its normal position and the top thereof pivoted upwardly to permit removal of the hook with the bait thereon.

Referring now specifically to the drawings, it will be seen that the numeral 10 generally designates the live bait holder of the present invention including a container 12 having an integral one-piece bottom 14 and peripheral side wall 16 wherein the bottom is in the form of a circular plate and the side wall 16 is in the form of a cylindrical member, each of which is provided with a plurality of spaced openings 18 therein. Attached to the peripheral side wall 16 is an eye member 20 for attachment to a flexible line 22 and the eye member 20 also secures a belt clip 24 to the container 12. The flexible line 22 is connected to a split ring or the like 26 at its terminal end for attachment to a suitable bracket 28 on a boat 30 wherein the live bait holder 10 may be suspended and positioned in the water 32 when the bait holder 10 is utilized with a boat. When a fisherman 34 is wading in the water 32, the live bait holder 10 may be attached to the belt 36 of the fisherman 34 by utilizing the belt clip 24 wherein the bait holder 10 is positioned out of the water such as would be desirable when bugs or roaches are utilized as bait. However, the flexible line 22 may be also attached to the belt 36 to permit the live bait holder 10 to be positioned in the water 32 when the fisherman 34 is wading therein, thereby retaining the bait in live condition. This arrangement is preferable when live minnows are utilized as bait, such as in the arrangement illustrated in Figure 1.

The upper end of the peripheral wall 16 of the container 12 is provided with an outwardly flared portion 38 having a plurality of inwardly extending open-ended slots 40 which extend completely across the flared portion 38 and downwardly into the peripheral side wall 16 of the container 12. Removably attached to the upper end of the container 12 is a removable top generally designated by the numeral 42 and including an upper circular plate 44 and a lower circular plate 46 interconnected by a plurality of downwardly and inwardly inclined segmental members 48 which are interconnected by a plurality of inwardly extending edges 50 joined together at their inner ends by a transverse wall 52 which generally form notches or recesses having an inclined inner edge designated by the numeral 54 and terminating in slots in the upper circular plate 44, as designated by the numeral 56 and the inner ends of the slots 56 are coincidental with the upper end of the inclined surface 54 formed by the inclined wall 52. The lower end of the inclined wall 52 is integrally formed with the periphery of the lower circular plate 46, thereby forming a closure for the open end of the container 12. It will be noted that the inclined surfaces 48 are spaced somewhat from the inclined surface of the flared portion 38 of the wall 16, thereby forming generally a positioning means for live bait 58 positioned within the container 12.

It will be noted that the center of the lower circular plate 46 is provided with a depending eye member 60 for receiving the hooked end 62 of an elongated coil spring 64 that has its other terminal hooked end 66 secured to an eye member 68 on the upper surface of the bottom 14 of the container 12.

It will be noted that the slots 40 in the container side wall 16 are aligned with the recesses in the inclined surfaces 48 and the slot 56 whereby the entire container 12 may be inverted so that the bait 58 will be positioned against the inner circular plate 46 and the inclined segmental surfaces 48 substantially as illustrated in Figure 6. In this position, a fishhook 70 attached to a fish line or leader 72 may be inserted through one of the slots 40 and the fishhook barb 74 may be inserted through the bait 58 wherein the bait 58 will be easily impaled by the fishhook 70. It will be noted that the particular construction of the inclined surfaces 38 and 48 is such that the surfaces are spaced from each other and directed upwardly and outwardly to form a pocket thereby positioning the bait 58 adjacent the slots 40 when the holder is turned upside down for easier insertion of the hook 70 into the bait 58. After the bait 58 has been impaled on the fishhook 70, the container 12 may then be righted to its normal position and the top 42 pivoted upwardly by tensioning and stretching spring 64, thereby permitting the bait 58 and the fishhook 70 to be removed from the slot 40, substantially as illustrated in Figure 8. Therefore, it will be seen that the fishhook 70 may be inserted into the interior of the container 12 without removing any top or opening any access opening after which the bait 58 may be easily impaled onto the hook 70 due to the particular construction of the slots 40, and the baited hook 70 may then be removed by tilting upwardly on the spring urged top member 42. The entire container 12 and top 42 may be constructed of transparent material, thereby permitting the relative positions of the hook 70 and the bait 58 to be observed for facilitating the impaling of the bait on the hook.

The hollow center construction of the top 42 will cause the holder 10 to float in the water for retaining the bait in live condition. However, the buoyancy of the top 42 will still permit stink bait or blood to be lowered to a position under the water to attract fish to the area in which the fishing is to be done since the hollow top 42 will not be adequate to float heavy bait.

Also, it will be understood that the container 12 of the present invention is of a convenient size so that each person in a boat can hang his own supply of minnows over the side, thus eliminating any disturbance to the other fishermen in the boat when it is necessary to rebait his hook. The main supply of minnows or other live bait can be kept in the water in a large bucket until the supply in the container 12 needs to be replenished. The container 12 is light and small enough to be stored in any regular size minnow bucket or tackle box when not in use, thereby eliminating a storage problem. Also, the bait holder 10 of the present invention eliminates the necessity of dipping hands in cold water for holding bait while baiting a hook and also permits a fisherman to bait his hook with gloves on.

It is not desired to limit the invention to the exact construction and operation shown and described, and accordingly, all suitable modifications and equivalents may be resorted to, falling within the scope of the invention as claimed.

What is claimed as new is as follows:

1. A live bait holder comprising a container having a bottom and peripheral wall with a plurality of apertures, a removable top on said container, spring means releasably retaining said top in position, and means for supporting said container, said top retaining means permitting upward pivotal movement of the top at any point about the periphery thereof, said top and adjacent portion of the container having a plurality of aligned slots to permit insertion of a fishhook into the interior of the container for impaling bait thereon without placing the hands on the bait, and said removable top and the upper end of the container having complementary outwardly flared portions disposed in spaced relation for positioning the bait adjacent the periphery of the top when the container is inverted thereby facilitating the impaling of bait on the fishhook.

2. A live bait holder comprising a container having a bottom and peripheral wall with a plurality of apertures, a removable top on said container, spring means releasably retaining said top in position, and means for supporting said container, said top retaining means permitting upward pivotal movement of the top at any point about the periphery thereof, said top and adjacent portion of the container having a plurality of aligned slots to permit insertion of a fishhook into the interior of the container for impaling bait thereon without placing the hands on the bait, said removable top and the upper end of the container having complementary outwardly flared portions disposed in spaced relation for positioning the bait adjacent the periphery of the top when the container is inverted thereby facilitating the impaling of bait on the fishhook, and said slots extending at least to the bottoms of said outwardly flared portions whereby bait may be easily impaled on a fishhook inserted through one of said slots.

3. A live bait holder comprising a container having a bottom and peripheral wall with a plurality of apertures, a removable top on said container, spring means releasably retaining said top in position, and means for supporting said container, said top retaining means permitting upward pivotal movement of the top at any point about the periphery thereof, said top and adjacent portion of the container having a plurality of aligned slots to permit insertion of a fishhook into the interior of the container for impaling bait thereon without placing the hands on the bait, said removable top and the upper end of the container having complementary outwardly flared portions disposed in spaced relation for positioning the bait adjacent the periphery of the top when the container is inverted thereby facilitating the impaling of bait on the fishhook, said slots extending at least to the bottoms of said outwardly flared portions whereby bait may be easily impaled on a fishhook inserted through one of said slots, said spring means including an elongated spring member terminally secured to the center of said top and to the center of the bottom of said container, and said spring member permitting opening of the top at any slot to permit removal of the baited hook.

4. The combination of claim 3 wherein said container is constructed of transparent material for observing the relationship of the bait and hook.

5. A bait holder comprising a container having an apertured bottom and peripheral wall, a top removably mounted on the container, and means for supporting the container, said top and adjacent portion of the peripheral wall having a plurality of aligned slots to permit insertion of a fishhook into the interior of the container for impaling bait thereon, and adjacent inner surfaces of the top and peripheral wall being spaced from each other and directed upwardly and outwardly to form a pocket for positioning bait adjacent the slots when the holder is turned upside down for providing access to the bait for impaling thereon.

6. A bait holder comprising a container having an apertured bottom and peripheral wall, a top removably mounted on the container, and means for supporting the container, said top and adjacent portion of the peripheral wall having a plurality of aligned slots to permit insertion of a fishhook into the interior of the container for impaling bait thereon, and adjacent inner surfaces of the top and peripheral wall having complementary means for positioning bait adjacent the slots for providing access to the bait for impaling thereon, and spring means urging said top to a closed position, said spring means connected to the center of the inner surface of the top for permitting upward pivotal movement of the top at any point about the periphery thereof.

References Cited in the file of this patent

UNITED STATES PATENTS

| | | |
|---|---|---|
| 724,823 | Deihl | Apr. 7, 1903 |
| 1,076,542 | Balch | Oct. 21, 1913 |
| 1,775,959 | Himes | Sept. 16, 1930 |
| 2,491,070 | Armstrong | Dec. 13, 1949 |
| 2,518,590 | Andrist | Aug. 15, 1950 |
| 2,560,381 | Babington | July 10, 1951 |
| 2,587,899 | Rhodes | Mar. 4, 1952 |
| 2,670,557 | Pachner | Mar. 2, 1954 |

FOREIGN PATENTS

| | | |
|---|---|---|
| 954,807 | France | June 20, 1949 |
| 969,670 | France | May 27, 1950 |